United States Patent Office 3,327,556
Patented June 27, 1967

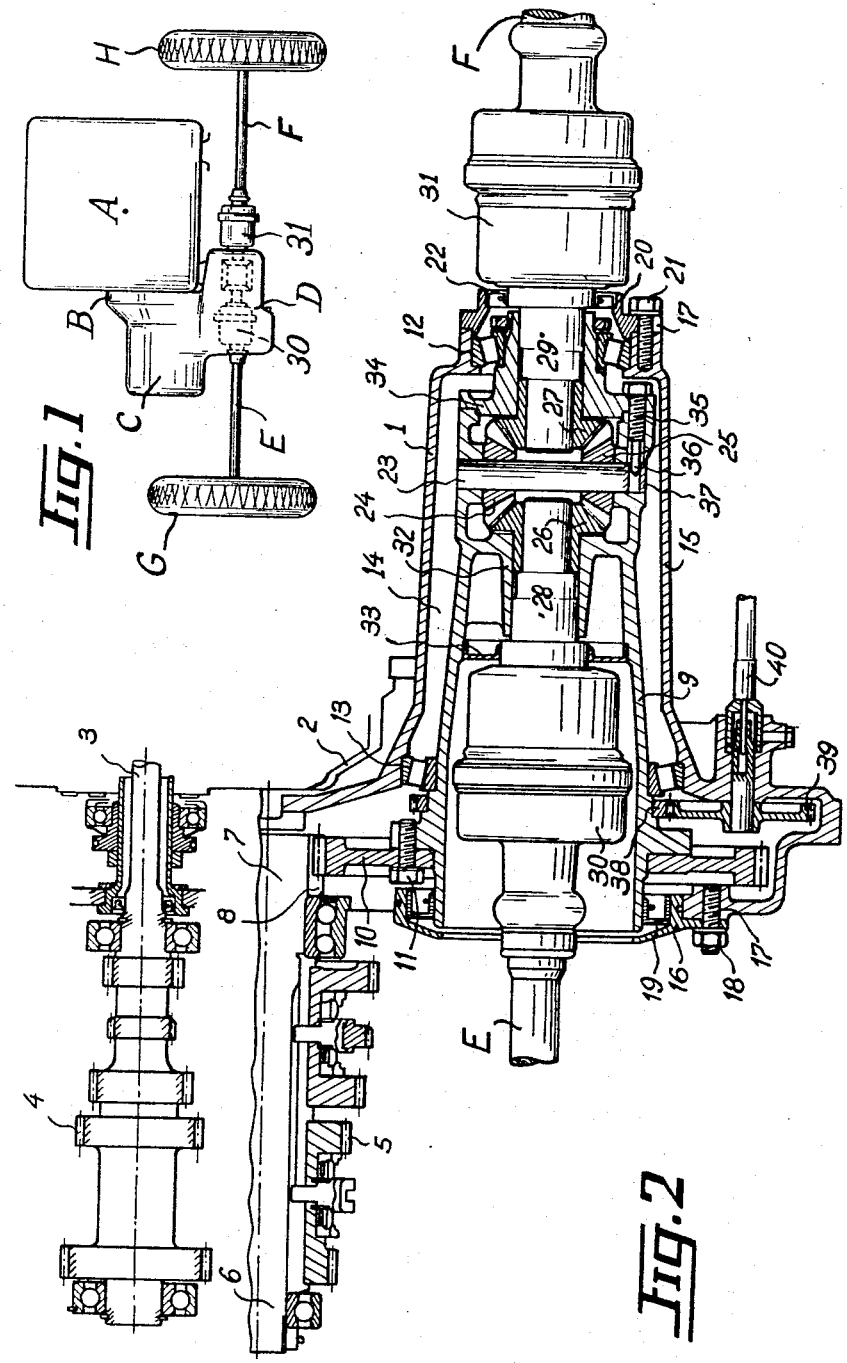

3,327,556
TRANSMISSION DEVICE FOR A MOTOR VEHICLE
Roger Blavette, Rueil-Malmaison, France, assignor to Societe Anonyme Simca Automobiles, Paris, France
Filed Mar. 19, 1965, Ser. No. 441,171
Claims priority, application France, Mar. 23, 1964, 968,279
4 Claims. (Cl. 74—701)

The present invention relates to a transmission device for a motor vehicle.

In present-day motor vehicles, designers seek to group the mechanical elements as much as possible around the engine in order that the engine and transmission unit which comprises the motor, the clutch, the gear-box and the differential, shall be as compact as possible. These units may thus be easily mounted on vehicles having their engine and drive units located at the front or rear.

On the other hand, so as not to increase the vehicle's bulk, it is desirable to have an overall length which is as small as possible and this latter condition favours locating the engine across the longitudinal axis of the vehicle.

In order to take these considerations into account, it has been proposed to use an engine and transmission unit, whose longitudinal axis is located across the longitudinal axis of the vehicle, with the half-shafts operatively coupled to the wheels parallel to the longitudinal axis of the engine and transmission unit.

It is necessary also to limit the length of the engine and transmission unit in order that it shall be accommodated within the size of the vehicle, and this has led to arranging the differential and the half-shafts for driving the wheels, beneath the engine. To this end, the clutch and the gear box are arranged in line with the engine and they are combined with the differential located beneath the engine housing at about the centre of the engine and transmission unit.

However, if the differential be located beneath the engine and transmission unit it must be moved off the vehicle axis, due to the fact that it must be properly positioned to be driven from the output shaft of the gear box and by reason of the great length of the engine with respect to this latter. Due to the fact that the differential must be moved, it results that the two half-shafts for driving the wheels are necessarily of different lengths and, apart from the mechanical problems to which such an asymmetrical transmission device gives rise, it presents the major disadvantage of complicating the manufacture and the stocking of spare parts.

It is an object of the invention to remedy or minimise this disadvantage.

It is a further object of the invention to provide a transmission device for a motor vehicle in which a hollow half-shaft is used to drive the differential from the output shaft of the gear box and receives within it one of the half-shafts operatively coupled to the road wheels. In this way, the differential may be arranged at about the centre of the engine and transmission unit and the half-shafts for driving the wheels may be of equal length.

Accordingly the invention consists in a transmission device for a motor vehicle, comprising an engine and transmission unit including transmission members for transmitting drive power from said engine to road wheels and comprising a clutch, and a gear box having an input shaft and an output shaft drivable at different gear reduction ratios through interengaging gear means, said transmission members being located in line with said engine and associated in combination with a differential for driving half-shafts operatively coupled to said wheels, said differential being located in the median part of said engine and transmission unit and said unit being enclosed in a housing, a hollow half-shaft connected between said output shaft of said gear box and said differential, said hollow half-shaft being located below said housing for said engine and transmission unit, with the longitudinal axis of said hollow half-shaft parallel to the axis of the said engine, said hollow half-shaft carrying a driving pinion in operative engagement with a pinion on said output shaft of said gear box and located on the side adjacent said clutch.

In order that the invention may be more clearly understood, reference will now be made to the accompanying drawings which show one embodiment thereof by way of example, and in which:

FIGURE 1 shows a part elevational view of the assembly, i.e. perpendicular to the vehicle axis, showing the engine unit and the drive transmission means to the wheels, and FIGURE 2 shows an axial section of the transmission members of the gear box or the differential.

Referring to the drawings, FIGURE 1 shows an engine and transmission unit constituted by an internal combustion engine A, a clutch B and a gear box C, which are located in line with one another in the usual way. Beneath the engine and transmission unit and at about its centre, is arranged a differential D, the arrangement being such that the engine unit axis is parallel to the half-shafts E and F which respectively drive the driving wheel G and H, which may be the rear wheels of the vehicle.

FIGURE 2 shows in greater detail the transmission means between the gear box C and the differential D, one part of the housing of the engine A and one part of the housing 2 of the clutch B being shown, the driven member (not shown) of which is integral with the input shaft 3 of the gear box C.

The longitudinal axis of the shaft 3 is in line with the engine crankshaft, and carries pinions 4 which cooperate with pinions 5 on the output shaft 6, in order to drive this latter at different gear reduction ratios.

At one of the ends 7 adjacent the clutch housing 2, the output shaft 6 is shaped to form a pinion 8 for driving a hollow half-shaft 9 through a pinion 10 secured thereto by means of bolts 11.

This hollow half-shaft 9 is mounted for rotation on ball-bearings 12, 13 mounted within an enclosure 14, constituted in part by the housing 1 of the engine unit and by an extension 15 thereof. This enclosure 14 is sealed at one end by a cover 16 secured to the housing extension 15 by means of bolts 17 and nuts 18. An annular joint or gasket 19 effects a seal between the cover 16 and the half-shaft 9. The other end of the enclosure 14 is similarly sealed by a cover 20 secured by bolts 21 and provided with an annular joint or gasket 22.

At its end opposite the pinion 10, the hollow shaft 9 receives a differential axle 23 located in the median part of the engine and transmission unit, on which are freely mounted two loose pinions 24, 25 which engage with two planetary gears 26, 27 respectively keyed to the two half-shafts 28, 29, for driving the wheels which are connected to the latter by means of universal joints 30, 31.

The half-shaft 28 extends into the hollow half-shaft 9 and is supported therein by a bearing 32 formed integrally with the casting of said half-shaft 9. An annular joint or gasket 33 arranged between the internal wall of the half-shaft 9 and the half-shaft 28 effects a seal on the output side of the latter.

The half-shaft 29 is supported by a support member 34 connected to the hollow half-shaft 9 in order to constitute with this latter a continuous assembly secured together by bolts 35. One of the bolts 35 shown is extended by a finger 36 which is engaged in an aperture 37 in the axle 23 in order to cooperate for securing it to the hollow half-shaft 9.

A toothed ring 38 secured to the half-shaft 9 and arranged on the exterior thereof, drives a pinion 39 which is connected to the speedometer of the vehicle by a flexible drive cable 40.

The enclosure 14 receiving the transmission mechanism of the gear box on the differential which is sealed by the annular joints or gaskets 19, 22 and 33 is in communication with the interior of the housing of the gear box and allows a common lubrication of the transmission mechanism of the gear box.

I claim:

1. A transmission device for the engine block of a motor vehicle comprising a clutch; a gear box having an input shaft and an output shaft, said clutch and gear box being aligned axially with said engine; a differential arranged under the engine housing and having a median plane identical to the one of the unit formed by the engine, clutch and gear box; a pair of universal joints disposed on opposite sides of said differential and connecting said differential to the transmission axles of the wheels of the vehicle; and a hollow shaft operatively connecting the output shaft of the gear box to said differential, said hollow shaft being situated under said unit with the axis of said hollow shaft extending parallel to the axis of the engine, said hollow shaft being provided with an inner housing receiving one of said universal joints.

2. A transmission device according to claim 1, further comprising a pair of additional shafts connecting each universal joint to said differential, at least one of said additional shafts extending into said hollow shaft.

3. A transmission device according to claim 1, further comprising a pair of additional shafts connecting each universal joint to a corresponding wheel of the vehicle, said additional shafts extending parallel to the longitudinal axis of said engine.

4. A transmission device according to claim 1, wherein the connection between said hollow shaft and said output shaft of the gear box is located in a closed housing in communication with said gear box.

References Cited

UNITED STATES PATENTS

| 1,649,361 | 11/1927 | Miller | 74—701 |
| 2,306,545 | 12/1942 | Kummich | 74—701 |
| 2,808,738 | 10/1957 | Bartell | 74—701 |
| 2,913,927 | 11/1959 | Issigonis | 74—701 |
| 3,051,017 | 8/1962 | Flinn | 74—701 X |

FOREIGN PATENTS

| 577,802 | 6/1959 | Canada. |
| 1,339,113 | 4/1963 | France. |
| 427,064 | 3/1926 | Germany. |

FRED C. MATTERN, JR., *Primary Examiner.*

DAVID J. WILLIAMOWSKY, *Examiner.*

C. J. HUSAR, *Assistant Examiner.*